Dec. 27, 1960    C. F. SCHAEFER ET AL    2,966,063
LINE OF SIGHT STABILIZING SYSTEM
Filed May 3, 1955     5 Sheets-Sheet 1

Fig 1

INVENTORS
CARL F. SCHAEFER
JOHN A. MEAD
BY
ATTORNEY

Fig 2

Dec. 27, 1960   C. F. SCHAEFER ET AL   2,966,063
LINE OF SIGHT STABILIZING SYSTEM
Filed May 3, 1955   5 Sheets-Sheet 3

INVENTORS
CARL F. SCHAEFER
JOHN A. MEAD
BY
ATTORNEY

Dec. 27, 1960     C. F. SCHAEFER ET AL     2,966,063
LINE OF SIGHT STABILIZING SYSTEM Filed May 3, 1955     5 Sheets-Sheet 5

Fig 5

INVENTORS
CARL F. SCHAEFER
JOHN A. MEAD
BY
ATTORNEY

United States Patent Office 2,966,063
Patented Dec. 27, 1960

2,966,063

LINE OF SIGHT STABILIZING SYSTEM

Carl F. Schaefer, Pleasantville, N.Y., and John A. Mead, Grand Rapids, Mich., assignors, by mesne assignments, to United Aircraft Corporation, East Hartford, Conn., a corporation of Delaware Filed May 3, 1955, Ser. No. 505,586

11 Claims. (Cl. 74—5.34)

Our invention relates to a line of sight stabilizing system and more particularly to a line of sight stabilizing system wherein the line of sight provided by a sighting device mounted in the deck plane of an aircraft or other vessel is held stabilized in space or fixed along the ground track irrespective of random motions or maneuvers of the aircraft.

In every problem in which a missile, fired or dropped from a moving platform, is to strike a given target, two general classes of corrections must be made. The first class of corrections includes those which result from motions of the platform carrying the device providing the line of sight. If, for example, the sighting device is carried by an aircraft or the like, such motions as roll, pitch, and yaw, as well as maneuvers of the aircraft as it approaches the target, affect the line of sight and must be compensated for. The other class of corrections which must be made are those caused by factors external to the platform and include ballistic corrections, correction for wind, target motion, changes in altitude, and the like.

In the prior art, the errors owing to platform motions must be continuously calculated and applied to the sighting device to establish the true line of sight. If, however, a line of sight can be established which is fixed in space irrespective of random movements and maneuvers of the aircraft, the external corrections may be calculated and applied to the stabilized line of sight.

It will readily be appreciated that if a sighting device such as a periscope or the like is mounted in the deck plane of an aircraft, errors are introduced into the line of sight by roll, pitch, and yaw of the aircraft. Moreover, when the deck plane tilts, azimuth deviations measured in the plane of the horizon may not be manifested as like angles in the tilted deck plane in which they are to be applied to reorient the line of sight. If an attempt is made to orient a periscope mounted in the deck plane in azimuth in accordance with an azimuth deviation indication measured in the plane of the horizon, an error may be introduced into the line of sight.

In the prior art attempts have been made to provide a stabilized line of sight by mounting the entire periscope assembly on a platform stabilized in the plane of the horizon. Obviously, such a periscope need not be compensated for any aircraft motion, since it is mounted on a stabilized platform. Moreover, azimuth corrections applied to the periscope are necessarily true since they are applied in the same plane in which they are generated. These assemblies of the prior art have not, however, provided a satisfactory solution to the problem. The mounting of a heavy sighting device, such as a periscope in a stabilized platform requires a stabilizing system which must be powerful and yet none the less sensitive to small deviations. The operator of such a sighting device must accommodate his eye to the position of the periscope which is continually shifting with the stabilized platform. These defects result in an impractical system which is heavy, cumbersome, and extremely inconvenient to use.

We have invented a line of sight stabilizing system which provides a sighting device mounted in the deck plane of an aircraft having a line of sight which is fixed in space. Our system enables us to establish a line of sight oriented in azimuth along the ground track made good by the aircraft and whose reference axes are oriented in a manner to facilitate angular measurement from a fixed azimuth in the horizontal plane.

One object of our invention is to provide a line of sight stabilizing system which provides a sighting device mounted in the deck plane of an aircraft having a line of sight fixed in space.

Another object of our invention is to provide a line of sight stabilizing system in which errors introduced into a sighting device mounted in the deck plane of an aircraft by roll, pitch, and yaw of the aircraft are continuously compensated.

A further object of our invention is to provide a line of sight stabilizing system which may selectively be held fixed in space or stabilized in the direction of the ground track of an aircraft carrying the device.

Still another object of our invention is to provide a line of sight stabilizing system which is fixed in space so that corrections due to factors external to the platform carrying the sighting device which provides the line of sight may be applied to the stabilized line of sight.

Other and further objects of our invention will appear from the following description.

In general, our invention contemplates the provision of a line of sight stabilizing system including a sighting device rotatably mounted in the deck plane of an aircraft. The sighting device is provided with a pair of optical elements adapted to be oriented to compensate for errors introduced into the line of sight by roll and pitch of the aircraft. In order to generate these corrections, we provide a gyroscope frame stabilized in the plane of the horizon. A pair of synchro-transmitters actuated from the stabilized frame energize respective synchro receivers which, through amplifiers, control servomotors to drive the correcting optical elements of the sighting device to compensate for roll and pitch of the aircraft. It will be appreciated that these correcting optical elements carried by the sighting device mounted in the deck plane provide a line of sight which is stabilized with respect to the plane of the horizon. In order to maintain the line of sight in azimuth in a true direction, azimuth corrections must be measured in the plane of the horizon and applied to the sighting device in the deck plane. In order to generate such corrections, we provide our system with a coordinate transforming means which translates the heading of the aircraft, manifest in the deck plane, to the plane of the horizon where it is compared with a selected true direction to provide an indication of true heading deviations. A correction between selected true direction and indicated true direction of the periscope is measured in the plane of the horizon. The resulting corrections are applied to the sighting device mounted in the deck plane to orient the line of sight to true fixed direction in azimuth. This is done by applying the corrections in azimuth in the deck plane, but measuring the effect of the application in the plane of the horizon. We have also provided our system with means for locking the sighting device to the heading of the aircraft.

In the accompanying drawings which form part of the instant specification and which are to be read in conjunction therewith and in which like reference numerals are used to indicate like parts in the various views.

Figure 4:
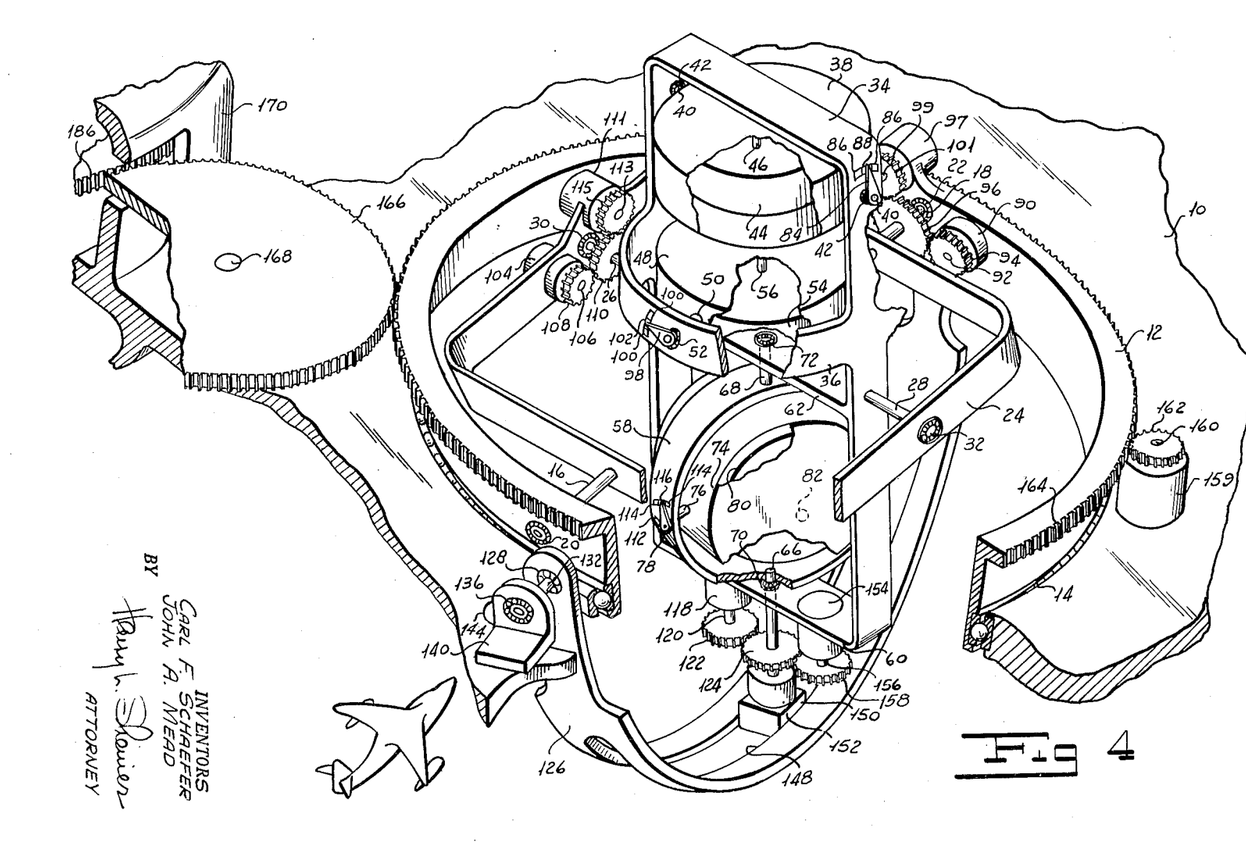
Figure 4 is a fragmentary perspective view of our line of sight stabilizing system with parts broken away showing the stabilized gyroscope assembly.

More particularly referring now to Figure 4 of the drawings, the stabilized gyroscope assembly of our line of sight stabilizing system includes a ring 12 rotatably mounted in the deck plane 10 of the aircraft by a circular ball bearing 14. We pivotally mount a roll ring 24 within the ring 12 by a pair of shafts 16 and 18 carried in respective bearings 20 and 22. The stabilized frame 34 of the gyroscope assembly is fixed on a pair of shafts 26 and 28 rotatably mounted in respective bearings 30 and 32 carried by the roll ring 24. The pitch ring 36 of the assembly is formed integrally with the frame 34. It will readily be appreciated that shafts 16 and 18, when aligned with the fore-and-aft axis of the craft, define the roll axis of the aircraft while shafts 26 and 28 define the pitch axis. Ring 12 is rotatably mounted in the deck plane 10. Since, however, it may not rotate in the plane of the horizon in which true azimuth indications are measured, ring 12 may be termed a "pseudo-azimuth ring."

The roll gyroscope housing 38 of the assembly is pivotally mounted on a pair of stub shafts 40 carried by bearings 42 mounted in the frame 34. The roll gyroscope rotor 44 has a shaft 46 mounted for rotation by any convenient means within the housing 38. The pitch gyroscope housing 48 is carried on stub shafts 50 mounted for rotation in bearings 52 carried by the pitch ring 36. The pitch gyroscope rotor 54 has a shaft 56 rotatably mounted within the housing 48 by any convenient means.

We provide an azimuth gimbal ring 58 fixed on shafts 66 and 68 mounted in respective bearings 70 and 72 carried in the base 60 of frame 34 and in a transverse bar 62 extending between the sides of the rectangular frame 34. Gimbal ring 58 carries a pair of bearings 78 supporting a pair of shafts 76 between which we mount the azimuth gyroscope housing 74. The azimuth gyroscope rotor 80 has a shaft 82 fixed by any convenient means for rotation within housing 74.

In order to provide a means for obtaining a signal which is a function of roll of the aircraft measured about the axis defined by shafts 16 and 18, we mount a roll synchro-transmitter 97 on ring 12. The roll synchro-transmitter rotor shaft 99 has a gear 101 fixed thereon which engages a gear 96 fixed on shaft 18. It will be appreciated that as the aircraft rolls, gear 96 drives gear 101 to rotate the rotor of synchro-transmitter 97 proportionally to the amount of roll, since roll ring 24 carrying shaft 18 is stationary with respect to the roll axis. As is known in the art, the stabilizing gyroscope tends to remain stable in space. When the aircraft rolls, both the ring 24 and the frame 34 tend to move with the deck plane. This movement of the frame with respect to the gyroscope rotor 44 causes a precessing torque to be applied to the gyroscope. Under the action of this torque, the spin axis of the rotor 44 tends to align itself with the torque axis, which is the roll axis of the aircraft. As the rotor 44 precesses, contactor 84 engages one of the contacts 86 to energize motor 90 to apply a torque to the roll ring 24 to counteract the precessing torque occasioned by roll of the aircraft. Thus, the roll gyroscope assembly including rotor 44 maintains ring 24 stationary in space with respect to the roll axis of the aircraft, which roll axis coincides with the axes of shafts 16 and 18. As the aircraft rolls, the deck plane 10 carrying ring 12 moves around the roll axis. Owing to the fact that ring 24 is stabilized in roll, gear 101 in engagement with the gear 96 on the shaft 18 carried by the stabilized roll ring is rotated through the amount of the roll. This rotation produces an output signal from the stator of synchro-transmitter 97 which is applied to one of the correcting optical elements of the sighting device in a manner to be described hereinafter. In order to obtain a signal which is a function of pitch of the aircraft measured about the axis defined by shafts 26 and 28, we mount a pitch synchro-transmitter 111 on roll ring 24. The pitch synchro-transmitter rotor shaft 113 has a gear 115 fixed thereon which engages a gear 110 fixed on shaft 26. It will be appreciated that as the craft pitches, gear 110 drives gear 115 to rotate the rotor of synchro-transmitter 111 proportionally to the amount of pitch, since pitch ring 36 carrying shaft 26 is stationary with respect to the pitch axis. As the craft pitches, ring 24 and the frame 34 tend to be carried along with the deck plane 10 as it moves around the pitch axis. This results in the application of a precessing torque to the rotor 54 of pitch gyroscope 48. Under the action of this torque the spin axis of the rotor 54 tends to align itself with the torque axis which is the pitch axis of the aircraft. When this occurs contact 98 engages one of the contacts 100 to energize the servomotor 104 to apply a torque to the frame 34 to compensate for the precessing torque occasioned by pitch of the aircraft. Thus, the pitch gyroscope including rotor 54 maintains ring 24 stationary in space with respect to the pitch axis of the aircraft, which pitch axis coincides with the axes of shafts 26 and 28. As the aircraft pitches, the deck plane 10 carrying ring 12 moves around the pitch axis. Owing to the fact that ring 24 is stabilized in roll, gear 115 in engagement with the gear 110 carried by shaft 26 is driven through the amount of pitch. This rotation of the rotor of synchro-transmitter 111 results in an output signal from the stator of the synchro-transmitter 111 which is applied to a second correcting optical element of the sighting device to compensate for pitch in a manner to be described in detail hereinafter. A course differential synchro-transmitter 154 is mounted on the base 60 of frame 34 and has a shaft 156 carrying a gear 158 adapted to engage gear 124 on shaft 66. The function of differential synchro-transmitter 154 will be explained in detail hereinafter.

In order that the indications obtained from the stabilized gyroscope system be indications with respect to the plane of the horizon, some means must be provided for stabilizing frame 34 in the horizontal plane. Both the roll and pitch gyroscope rotors 44 and 54 are maintained with their spin axes vertical by erecting systems well known to the art but not shown. The direction of spin of the respective rotors 44 and 54 may be any selected direction such, for example, as clockwise when viewed from above in Figure 4. To facilitate the explanation of the gyroscope frame stabilizing system, we will assume that the aircraft is traveling north from south and that a left climbing turn is made.

In order that the plane turn to the left it must bank to the left as viewed in Figure 4. This bank to the left results in a motion of the deck plane 10 about the axis defined by shafts 16 and 18 in a counterclockwise direction as viewed from the after end of the plane. Because of the drag occasioned by the engagement of the gear 101 carried by roll synchro-transmitter rotor shaft 99 with the gear 96 carried by shaft 18 and because of the friction in bearings 20 and 22 carried by ring 12 mounted in the deck plane, the roll ring 24 and the frame 34 carried thereby tend to rotate with the deck plane. This counter-clockwise rotation of frame 34 with respect to the gyroscope rotor 44 causes a torque on the roll gyroscope 38 such that the upper end of shaft 46 precesses forwardly. Some means must be provided for generating a torque to counteract the torque occasioning this precession. We mount a servomotor 90 on ring 12. Servomotor 90 has a shaft 92 which carries a gear 94 for driving gear 96 fixed on shaft 18. One of the stub shafts 40 supporting the roll gyroscope housing 38 carries a contactor 84. A pair of contacts 86 mounted on the frame 34 are separated by an insulating segment 88. When the frame 34 is stabilized in the plane of the horizon, contactor 84 rests upon the insulating segment 88. When, however, the upper end of shaft 46 precesses forwardly or rearwardly, contactor 84 engages one of the contacts 86. When contactor 84 engages a contact 86, the circuit of servomotor 90 is completed through means (not shown) so that shaft 92 rotates. The arrangement is such that when the upper end of shaft 46 precesses either forwardly or rearwardly so that contactor 84 engages a contact 86, shaft 92 rotates in a direction to apply a torque to ring 24 which is opposite to the torque occasioning the precession of shaft 46.

When the aircraft climbs, its nose is pointed upward and the deck plane 10 is rotated in a counterclockwise direction with respect to the frame 34 about the axis defined by shafts 26 and 28 as viewed from the right in Figure 4. Due to the drag caused by the engagement of gear 115 on the pitch synchro-transmitter rotor shaft 113 with gear 110 on shaft 26 and the friction in bearings 30 and 32 carried by ring 24, frame 34 tends to be carried along with the deck plane as the plane climbs. This results in a counterclockwise torque applied to the frame 34 about the axis defined by shafts 26 and 28 as viewed from the right in Figure 4. This torque causes a precession of the upper end of shaft 56 of the pitch gyroscope to the left. To compensate for this precession a means must be provided for applying a torque to frame 34 in a direction opposite to the direction of the torque causing the precession. A contactor 98 carried by one of the shafts 50 is adapted to engage one or the other of a pair of contacts 100 carried by ring 36 as the upper end of shaft 56 precesses to the left or right. Contactors 100 are separated by an insulating segment 102. When frame 34 is stabilized, contactor 98 rests upon the insulating segment 102. When, however, the upper end of shaft 56 precesses, contactor 98 engages one of the contacts 100 to complete the circuit of a servomotor 104 carried by the ring 94 through means (not shown). The shaft 106 of servomotor 104 has gear 108 fixed thereon which engages gear 110 fixed on shaft 26. The arrangement is such that when the upper end of shaft 56 precesses to the left or right, one of the contacts 100 is engaged by contactor 98 so that shaft 106 rotates in a direction to apply a torque to frame 34 which is opposite to the torque causing the precession.

Gimbal ring 58 is initially oriented in a particular reference direction which may be true north. As the aircraft turns to the left, deck plane 10 rotates in a counterclockwise direction about the axis defined by shafts 68 and 66 as viewed from above. Because of the drag exerted on frame 34 by the engagement of gear 124 on shaft 66 with gear 158 on shaft 156 and because of the friction in bearings 70 and 72 supporting gimbal 58, the gimbal 58 tends to rotate with the deck plane 10. This movement results in a counterclockwise torque about the axis defined by shafts 68 and 66 as viewed from above. Assuming rotor 80 is spinning in a clockwise direction as viewed from the right, the torque resulting from the left turn tends to precess the starboard end of shaft 82 downwardly. In order to compensate for this precession, some means must be provided for applying a torque to gimbal 58 in a direction opposite to the torque producing the precession. A contactor 116 fixed on shaft 76 is adapted to engage one of a pair of contacts 114 on the side of gimbal 58. An insulating segment 116 separates contacts 114. When gimbal 58 is oriented in the reference direction, contactor 112 engages segment 116. When, however, contactor 112 engages one of the contacts 114, the circuit of a servomotor 118 fixed on base 16 is completed through means (not shown) to rotate the shaft 120 of servomotor 118. A gear 122 fixed on shaft 120 engages and drives gear 124 on shaft 66. The arrangement is such that when the circuit of servomotor 118 is completed by engagement of contactor 112 with one of the contacts 114 or 116, gear 122 drives gear 124 to apply a torque around the axis defined by shafts 66 and 68 in a direction opposite to the torque causing the precession.

It will be appreciated that we have provided a gyroscope assembly which is stabilized in the plane of the horizon and oriented to a selected reference direction. Frame 34 may also be provided with means for compensating for rotation of the earth about its axis and for changes of latitude by means well known in the art but not shown. An example of a complete stabilizing system for gyroscopes is disclosed in Patent No. 2,606,448, issued August 12, 1953, to Carl L. Norden and William C. Coulbourn. From this stabilized system we are able to obtain true indications of pitch and roll, as well as azimuth deviations which are in the plane of the horizon.

Figure 5:
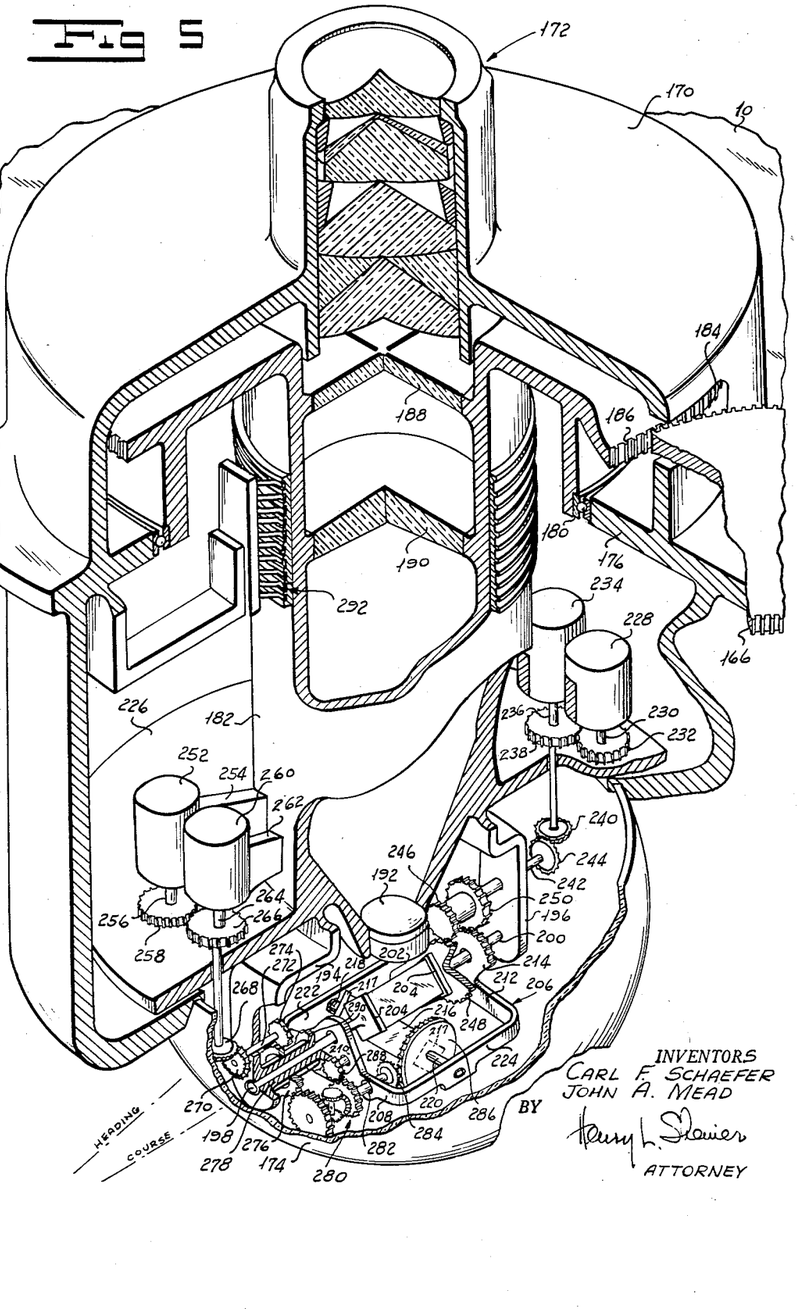
Figure 5 is a fragmentary perspective view of our line of sight stabilizing system with parts broken away showing the sighting device assembly.

Referring now to Figure 5, we rotatably mount a periscope housing 170 formed with an eye piece, indicated generally by the reference character 172, in the deck plane 10 of the aircraft. Housing 170 is formed with an interior flange 176 which supports the periscope tube 182 by means of a circular ball bearing 180. Tube 182 carries a reticle 188 and lenses 190 and 192 for focusing the image of the target on reticle 188. Tube 182 is formed at its upper end with a circular gear 186 by means of which it is adapted to be rotated in bearing 180 in a manner to be described hereinafter.

A transparent globe 174 carried by the base of the housing 170 encloses the optical compensating elements of the periscope assembly. A pair of shafts 198 and 200 are, respectively, rotatably mounted in a pair of flanges 194 and 196 formed at the bottom of tube 182. Each of the shafts 190 and 200 carries a cap 204 adapted to fit over one of the ends of a roll prism 202 to support the roll prism 202 directly below lens 192. A rectangular frame, indicated generally by the reference character 206, includes a pair of parallel legs 208 and 212. A lug 210 formed on leg 208 surrounds shaft 198. A fixed gear segment 214 formed on leg 212 surrounds shaft 200. Lug 210 and segment 214 swingably suspend the rectangular frame 206 from shafts 198 and 200. The pitch prism 216 of the periscope assembly is supported between a pair of caps 217 fixed on respective shafts 218 and 220 rotatably mounted in the other pair of parallel legs 222 and 224 of frame 206.

It will be appreciated that if the respective roll and pitch prisms 202 and 216 are rotated in accordance with the roll and pitch of the aircraft, the line of sight provided by the periscope assembly will continuously be compensated for errors which would be introduced by roll and pitch. As explained hereinbefore, the roll synchro-transmitter 97 produces an output signal which is a function of the roll of the aircraft. In order to apply a correction corresponding to this signal to the roll prism 202, we provide a roll synchro-receiver 228 which may be supported from tube 182 by any suitable means such as a bracket (not shown). When the stator of synchro-receiver 228 is fed with a signal from the stator of synchro-transmitter 97, the rotor of synchro-receiver 228 will produce an output signal which is a measure of the angular displacement of the rotor of the transmitter 97 resulting from roll. This signal may be amplified and fed to a roll servomotor 234. When this signal is fed to the servomotor 234, shaft 236 rotates proportionally to the amount of roll. A gear 238 fixed on shaft 236 engages a gear 232 fixed on the rotor shaft 230 of synchro-receiver 228 to rotate the rotor of synchro-receiver 228 to a position where the signal output from the rotor, representing the error in line of sight introduced by roll of the aircraft, is reduced to zero. A bevel gear 240 is fixed on the end of shaft 236 and engages a bevel gear 244 fixed to a shaft 242 rotatably supported in flange 196. A gear 146 on shaft 142 drives a gear 148 fixed on shaft 200 to rotate the roll prism 202 in a direction to reorient the line of sight to compensate for errors therein introduced by roll of the aircraft. A gear 250 fixed on shaft 242 drives fixed gear segment 214 to rotate the frame 206 through an angle corresponding to the roll correction, thereby maintaining the correct relationship between the respective roll and pitch prisms 202 and 216.

In order to correct the line of sight for errors which would be introduced by pitch of the aircraft and to introduce elevation angle, the pitch prism 216 must be rotated through an angle corresponding to the error introduced by pitch of the aircraft. The elevation angle is determined by a computer (not shown, since it is known to the art and forms no part of the instant invention). The algebraic sum of the elevation angle and pitch error comprises the signal fed to the pitch and elevation synchro-receiver 252. For purposes of simplicity we will refer to "pitch" corrections. It is to be understood, however, that this means a pitch correction applied to the elevation angle. As has been explained hereinbefore, when the aircraft pitches, the pitch synchro-transmitter 111 produces an output signal which is a function of the pitch. This output signal forms a component of the signal which is fed to the stator of a pitch synchro-receiver 252 carried by a bracket 254 formed on the tube 182. As a result of the input signal to the stator of synchro-receiver 252, the rotor of synchro-receiver 252 produces an output signal which, through an amplifier, drives shaft 256 of receiver 252 through the pitch angle thereby reducing the output error signal to zero. When this occurs, the pitch prism will have been rotated to a position representelevation angle and pitch correction. A bevel gear 268 fixed on shaft 264 drives a bevel gear 270 fixed on a shaft 274 rotatably mounted in flange 194. A gear 274 fixed on shaft 272 drives a gear 276 rotatably mounted on a laterally extending sleeve formed on flange 194. Gear 276 drives the input gear of a differential, indicated generally by the reference character 280, which drives a shaft 282 rotatably carried in leg 208 of frame 206. A bevel gear 284 on shaft 282 drives a bevel gear 286 fixed on shaft 220 to rotate pitch prism 216 through an angle sufficient to compensate for the error which would be introduced into the line of sight by pitch of the aircraft. An idler gear 288 rotatably mounted on leg 208 of frame 206 provides an engagement between the differential 280 and a gear 290 formed on sleeve 278. The differential drive arrangement for the pitch and elevation prism 216 provides a means by which this prism may be rotated irrespective of the position to which frame 206 has been rotated by the roll gearing when correcting for roll. A brush and slip ring assembly, indicated generally by the reference character 292, provides a means by which electrical connection may be made between a source external to the tube 182 and the electrical elements carried by the tube while permitting rotation of the tube.

From the structure thus far described, it will be appreciated that we have provided a line of sight which is compensated for errors which would be introduced therein by roll and pitch of the aircraft. It remains only to orient the periscope in azimuth to the true line of sight as the aircraft yaws or maneuvers in azimuth. Azimuth deviations resulting from yaw or changes in heading of the aircraft are measured in the plane of the horizon. We wish, however, to apply corrections corresponding to these deviations to a periscope assembly which is rotatably mounted in the deck plane of the aircraft. If an attempt is made to apply azimuth indications generated in the plane of the horizon to a device mounted in the deck plane of the aircraft without corrections, errors will be introduced.

Figure 2:
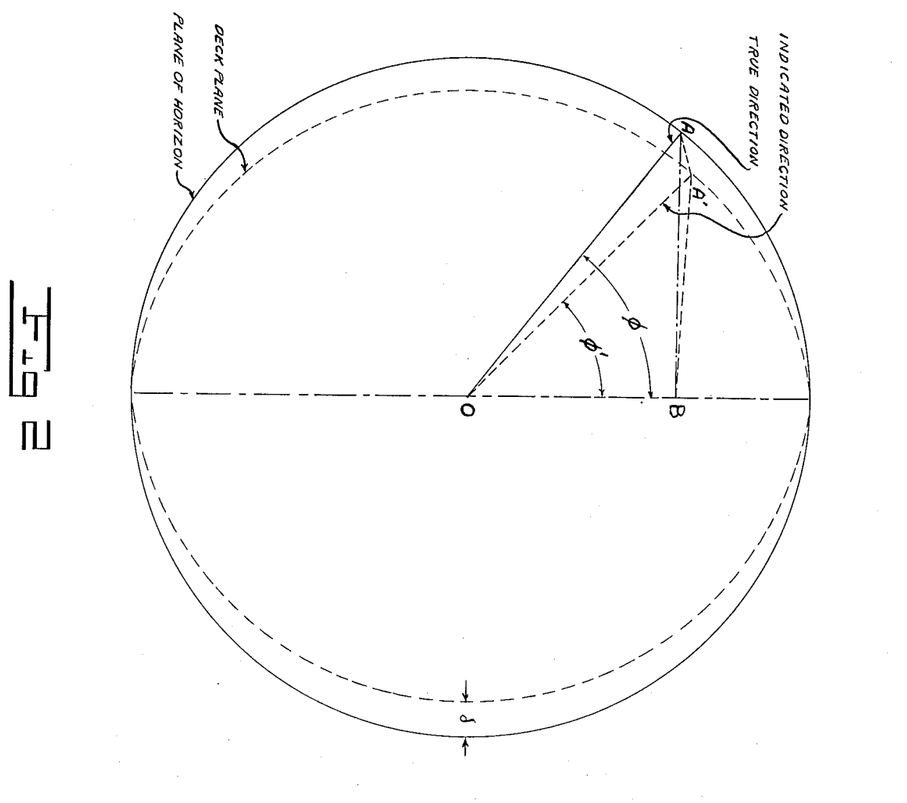
Figure 2 is a diagrammatic view showing the generation of the correction necessary to be applied on the deck plane when a true direction in the plane of the horizon is to be translated to the tilted deck plane of an aircraft.

Referring now to Figure 2, which represents the generation of a correction from true direction to indicated direction, it can be seen that the plane of the horizon and the pseudo-azimuth plane or deck plane in which the periscope assembly is mounted intersect along a common line which is the axis of tilt of the deck plane with respect to the plane of the horizon. The angle $\phi$ is the angle between the axis of tilt and the true reference direction in the plane of the horizon, represented by line OA. The angle $\phi'$ is the angle between the axis of tilt and the indicated reference direction in the deck plane, represented by line OA'. The line AA' is a line from point A perpendicular to the deck plane at point A'. The plane AA'B is a plane passing through line AA' and perpendicular to the tilt axis at B. From the figure it can readily be seen that:

(1) $$\tan \phi = \frac{AB}{OB}$$

(2) $$\tan \phi' = \frac{A'B}{OB}$$

If $\delta$ is the angle of tilt between the plane of the horizon and the deck plane:

(3) $$\cos \delta = \frac{A'B}{AB}$$

Dividing Equation 1 by Equation 2:

(4) $$\frac{\tan \phi}{\tan \phi'} = \frac{AB}{A'B} = \frac{1}{\cos \delta}$$

or (5) $$\tan \phi = \frac{\tan \phi'}{\cos \delta}$$

It will readily be appreciated that Equation 5 expresses a physically correct relationship, since the angle $\phi$ will always be equal to or greater than the angle $\phi'$ no matter in what quadrant the reference direction lies and irrespective of the direction of tilt of the deck plane with respect to the plane of the horizon. From Equation 5 it follows that a correction must be made in order to obtain a true direction in the plane of the horizon from an indicated direction in the deck plane. If, however, the deck plane coincides with the plane of the horizon, the angle $\delta$ is zero and $\phi = \phi'$. It will be noted also that if the aircraft is headed along the axis OB in Figure 4 and the line of sight is oriented to the heading, no errors in azimuth are introduced, since the angle $\phi$ will be zero and no correction need be made for deck plane tilt. We have provided our line of sight stabilization system with a means for automatically making this correction without the necessity of resorting to a computer to perform these calculations.

We have described the manner in which the line of sight is stabilized in space with respect to transverse and fore-and-aft axes. We will now consider the manner of correcting for errors introduced in azimuth by the tilting of the deck plane in which the periscope is mounted with respect to the plane of the horizon in which errors are measured. In essence we provide a co-ordinate transformer by rotating the periscope and sensing the effect of the rotation of the line of sight produced in the plane of the horizon.

Figure 3:
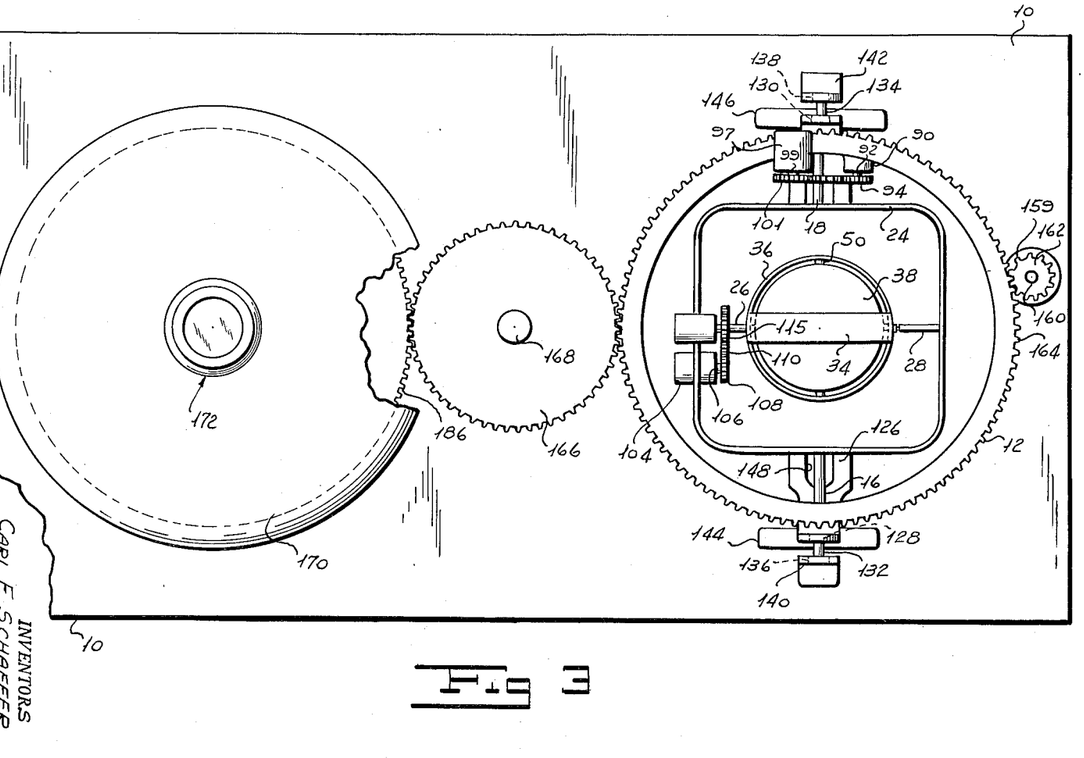
Figure 3 is a plan view of our line of sight stabilizing system with parts broken away.

Referring now to Figures 3 and 4, in order to provide a heading indication and means for translating the heading indication from the deck plane to the plane of horizon, we mount a heading synchro transmitter 150, carried by shaft 66, on a block 152 slidably disposed in a slot 148 formed in a bail 126. The ends of bail 126 extend upwardly through openings 144 and 146 formed in the deck plane and are mounted, respectively, on bearings 128 and 130 carried by shafts 132 and 134 disposed along the fore-and-aft axis of the aircraft. Shafts 132 and 134 are mounted in respective bearings 136 and 138 carried by brackets 140 and 142 welded to the deck plane 10. It will be appreciated that pendulous bail 126 is swingably supported from the deck plane 10 and is oriented in azimuth to the heading of the aircraft, since it is mounted around an axis parallel to the afore-and-aft axis of the aircraft. A change in the aircraft heading which is manifest by a rotation in the deck plane is translated to the plane of the horizon by the swingably supported bail 126 which orients the stator winding of the heading synchro transmitter 150. It can be seen that the rotor winding of synchro transmitter 150 is carried by shaft 66 and is oriented to the reference direction provided by gimbal 58. Similarly, the rotor winding of the course differential synchro transmitter 154 is oriented to the reference direction by the engagement of gear 124 on shaft 66 with gear 158 on shaft 156. As will be explained in detail hereinafter, the output signal of the stator winding of course differential synchro 154 which is carried by frame 34 is a function of the angle between the heading of the aircraft and the direction to which the periscope is oriented. In order that a line of sight which is stabilized in space in the direction of the aircraft ground track be provided, it is necessary that this angle be equal to the actual drift angle of the aircraft. We provide a drift synchro-receiver, to be described hereinafter, the stator of which is electrically connected to the stator of the course differential synchro 154, so that it is fed with the signal which is a function of the angle between the heading of the aircraft and the direction to which the periscope is oriented. We rotate the rotor of the drift synchro-receiver in accordance with the true computed drift angle of the aircraft. As a result of the connection of the drift synchro-receiver stator with the stator of the course differential synchro and the rotation of the drift synchro-receiver rotor, the drift synchro-receiver rotor produces an output signal which is a function of the difference between the computed drift angle and the angle between the aircraft heading and the direction to which the periscope is oriented. In order to reduce the difference between these angles to zero so that the line of sight will be continuously oriented in azimuth to the true course, we provide a pseudo azimuth servomotor 159 mounted on the deck plane of the aircraft and controlled by the output signal from the computer drift synchro receiver. The shaft 160 of the servomotor 159 carries a gear 162 adapted to engage gear teeth 164 formed on the periphery of ring 12. An idler gear 166 rotatably mounted on a shaft 168 fixed in the deck plane provides a driving engagement between ring 12 and the gear 186 formed on the periscope tube 182. This connection ensures a corresponding rotation of tube 182 when ring 12 rotates. Shaft 160 of servomotor 159 rotates proportionally to the difference between the computed drift angle and the angle between the heading of the aircraft and the direction to which the periscope is oriented. Bail 126, mounted along the fore-and-aft axis of the aircraft, rotates the rotor of heading synchro transmitter 150 carried by the stabilized frame 34. Thereby the bail 126 translates the indicated heading, manifest in the deck plane, to the plane of the horizon. As will be explained in detail hereinafter, the course differential synchro 154 algebraically adds this translated heading and the direction to which the periscope is oriented to produce an output signal which is a function of the angle between the true heading of the aircraft and the direction to which the periscope is oriented. A drift angle synchro-receiver may be provided to compare this last-mentioned angle with the computed drift angle. The output signal from the drift synchro-receiver controls the operation of servomotor 159. As a result, servomotor 159 rotates ring 12 and periscope tube 182 through a correcting angle which is measured in the plane of the horizon. Thereby, the line of sight, which has been corrected for roll and pitch of the aircraft so as to be stabilized with respect to the plane of the horizon, is corrected in azimuth by an angle which is measured in the plane of the horizon.

Figure 1:
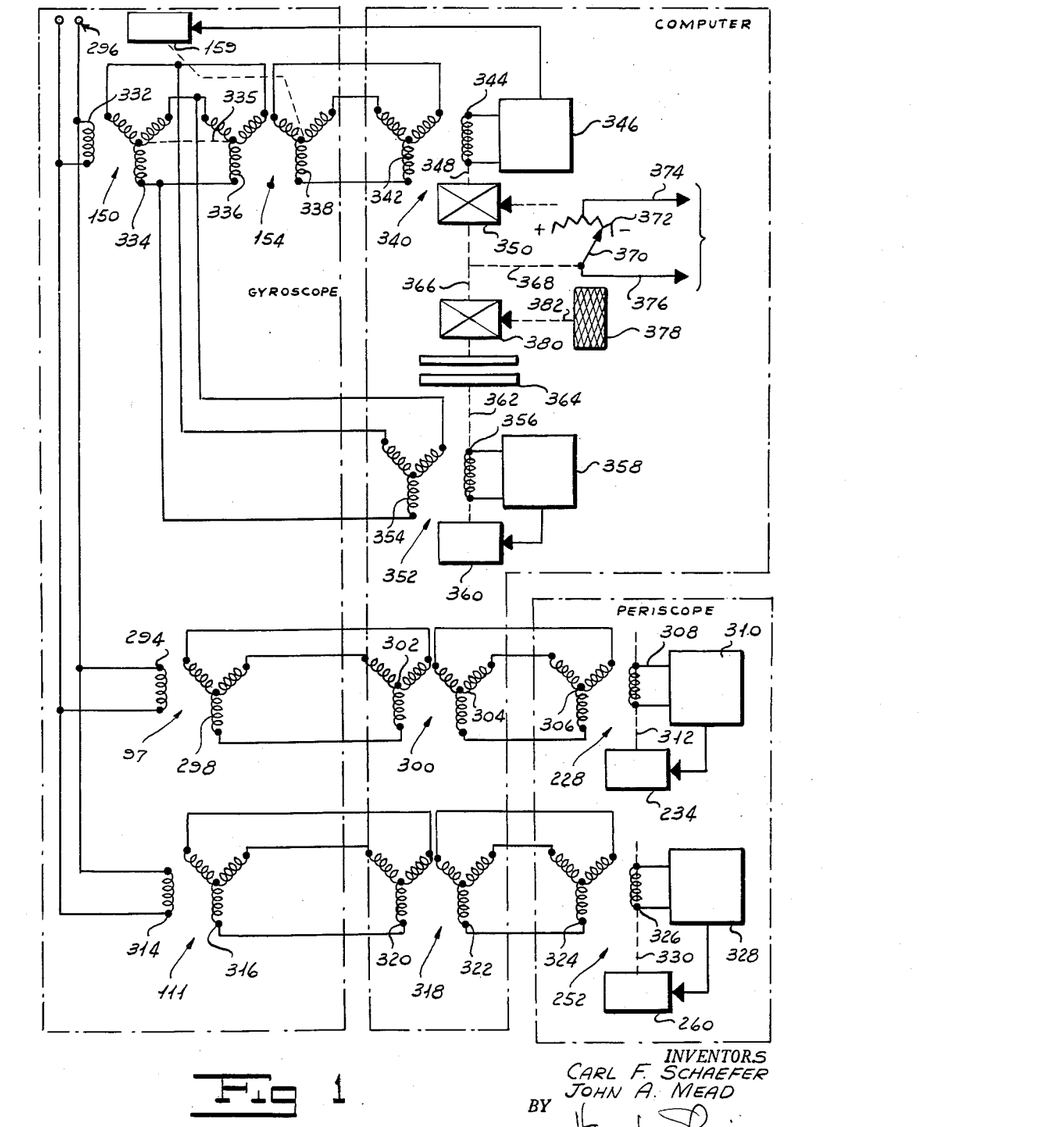
Figure 1 is a schematic view showing the electrical circuits employed in our line of sight stabilizing system.

The electrical circuits employed in our line of sight stabilization system are illustrated in Figure 1. For purposes of convenience, the portion of the circuit which compensates for roll and pitch of the aircraft will be described first. The roll synchro-transmitter 97 includes a rotor winding 294 carried by shaft 99 and supplied with electrical energy from a suitable source, indicated generally by the reference character 296. The stator winding 298 of synchro-transmitter 97 is carried by ring 12. When the aircraft rolls, stator 298 will produce an output signal which is a function of the roll. Since our system provides a line of sight which is stabilized in space, it is possible to introduce corrections resulting from factors external to the platform carrying the sighting device. For example, cross trail may be applied to the stabilized line of sight. In order to accomplish this, we connect the stator winding 302 of a cross trail differential synchro, indicated generally by the reference character 300, to the stator winding 298 of synchro transmitter 97. We rotate the rotor winding 304 of differential synchro 300 in accordance with computed cross trail whereby the output signal from winding 304 is a function of the correction for roll modified by the computed cross trail correction. The roll synchro-receiver 228 includes a stator winding 306 and a rotor winding 308 carried by shaft 230. Stator 306 is connected to rotor 304 of differential synchro 300. Rotor 308 of synchro-receiver 228 has an output which is a function of the difference between the angle of orientation of the roll prism 202 and the orientation represented by the signal of differential synchro stator winding 306. This output signal from rotor 308 is amplified by an amplifier 310 and fed to the roll servomotor 234. The shaft 236 of servomotor 234 rotates roll prism 202 and frame 206 carrying the pitch prism 216 through an angle corresponding to the angle represented by the signal output from winding 308. It will be appreciated that gear 238 on shaft 236 and gear 232 on shaft 230 provide a mechanical linkage between the servomotor and the roll synchro-receiver rotor winding 308. As servomotor shaft 236 rotates, it rotates a winding 308 in a direction to reduce the error signal output resulting from the difference between the angular position of rotor 308 and the angle represented by the output signal from winding 304 to zero. It will be appreciated that the operation described corrects the line of sight for errors which would be introduced by roll of the aircraft and by cross trail.

The pitch synchro-transmitter 111 includes a rotor winding 314 carried by shaft 113 and supplied with electrical energy from source 296. The stator winding 316 of pitch synchro-transmitter 111 is carried by roll ring 24. When the aircraft pitches, the stator winding 316 produces an output signal representative of the pitch. The angle through which the line of sight must be depressed from the horizontal, in the case of an aircraft, is called "elevation angle." This varies in accordance with altitude and ground range and is normally continuously obtained by a computer (not shown). In order to continuously introduce the elevation angle into our stabilized line of sight, we provide an elevation angle differential synchro, indicated generally by the reference character 318, including a stator winding 320 and a rotor winding 322. The stator 320 is connected to the stator 316 of the pitch synchro transmitter 111. The rotor 322 of differential synchro 318 is rotated in accordance with computed elevation angle to produce an output signal which is a function of the algebraic sum of the correction for pitch and the elevation angle correction. Rotor 322 is electrically connected to the stator 324 of the pitch synchro receiver 252. As a result, the rotor 326 of the pitch synchro-receiver 252 produces an output signal which is representative of the difference between the angle to which rotor 326 is oriented and the angle represented by the signal from stator 324. This output signal from rotor 326 is amplified by an amplifier 328 and fed to the pitch servomotor 260. The pitch servomotor shaft 264 rotates through an angle as a function of the signal output from rotor 326. It will be appreciated that gear 266 on servomotor shaft 264 and gear 258 on shaft 256 provide a mechanical linkage between the servomotor shaft 264 and rotor winding 326. This linkage is indicated by reference character 330 in Figure 6. As the servomotor shaft 264 rotates, it rotates winding 326 in a direction to reduce the error signal output from winding 326 which represents the difference between the angle to which rotor 326 is oriented and the signal output from rotor winding 322 to zero. Shaft 264 rotates the pitch prism 216 to compensate for errors which would be introduced into the line of sight by pitch of the aircraft and also introduces elevation angle into the line of sight.

It will be seen that the electrical system thus far described provides a line of sight which is corrected for errors which are introduced by roll and pitch of the aircraft as well as for cross trail and changes in elevation angle. Since the roll and pitch prisms of the periscope assembly provide a line of sight which is stabilized with respect to a horizontal plane, the periscope tube carrying the prisms must be rotated through a correcting angle which is measured in the horizontal plane in order that the line of sight be properly oriented in azimuth. In order to accomplish this we take a heading indication from the deck plane of the aircraft, translate it to the horizontal plane by means of the bail 126 and compare it with the reference direction alone or with the direction to which the periscope is oriented and compare the result with the computed drift angle to obtain an error angle which is in the plane of the horizon. A correcting rotation corresponding to this error angle is applied to the periscope tube to rotate the tube through the angle measured in the plane of the horizon to orient the line of sight in azimuth. It will be appreciated that bail 126 in effect rotates the deck plane in which the aircraft is maneuvered to the plane of the horizon so that the stator winding of the heading synchro-transmitter 150 is rotated in accordance with true heading. Referring now to Figure 1, the heading synchro-transmitter 150 includes a stator 332 carried on block 152 and supplied with electrical energy from source 296. As explained hereinbefore, bail 126 in which block 152 is mounted, effectively translates the aircraft heading indication in the deck plane 10 to the plane of the horizon to rotate stator 332 to the true heading of the aircraft. Rotor winding 334 of the heading synchro-transmitter 150 is carried by shaft 66 and oriented to the reference direction provided by gimbal ring 58. The course differential synchro 154 includes a rotor winding 336 carried by shaft 156 and a stator winding 338 mounted on the frame 34. Gear 124 on shaft 66 and gear 158 on shaft 156 provide a mechanical linkage between rotor winding 334 and rotor winding 336, by virtue of which rotor winding 336 is also oriented to the reference direction provided by gimbal 58. This linkage is indicated by reference character 335 in Figure 1. Rotor winding 336 of course differential synchro 154 is electrically connected to the rotor 334 of the heading synchro-transmitter 150. Since stator winding 338 of the course differential synchro 154 is carried by the stabilized frame 34 which, in turn, is carried by ring 12, it will be oriented in azimuth to the same direction as is the periscope tube 182. Winding 338 will, therefore, produce an output signal which is representative of the angle between the true heading of the aircraft and the direction to which the line of sight is oriented by periscope tube 182. We provide our computer with a drift synchro-receiver, indicated generally by the reference character 340. The stator winding 342 of synchro-receiver 340 is electrically connected to the stator 338 of the course differential synchro 154. In order to orient the line of sight along the true course made good by the aircraft, we rotate the rotor 344 of synchro-receiver 340 in accordance with the computed drift angle. As a result of this rotation, rotor 344 produces an output signal which represents the difference of the angle between the heading of the aircraft and the direction to which the line of sight is oriented and the computed drift angle. This output signal from rotor 344 is amplified by an amplifier 346 and fed to the pseudo azimuth servomotor 159. As has been explained hereinbefore, servomotor 159 rotates the ring 12 carrying the frame 34 and the periscope tube 182 through the same angle. The error signal produced by winding 344 represents an angle measured in the horizontal plane. Servomotor 159 rotates periscope tube 182 in the deck plane. Since the prisms carried by the periscope tube 182 provide a line of sight which is to be oriented in the plane of the horizon, the rotation of periscope tube 182 in the deck plane through an angle measured in the plane of the horizon will properly orient the line of sight in azimuth. If the computed drift angle is zero, winding 344 produces a signal which is a function of the changes in heading of the aircraft whereby servomotor 159 rotates the periscope tube in accordance with true heading. We provide a gear box 350 having an output shaft 348 on which we mount winding 344. Gear box 350 provides a means by which winding 344 may be rotated through the computed drift angle.

Our line of sight stabilization system automatically compensates for yaw of the aircraft. If the plane yaws, its heading changes and stator 332 rotates to produce a signal as a function of yaw in the rotor 334. When this yaw or change of heading is compared with the angle to which the periscope is oriented, which preferably is the course made good by the aircraft, a change in the output signal from stator 338 results. When this output signal from winding 338 is compared with the computed drift angle which has not changed because of yaw, winding 334 produces a signal proportional to yaw and servomotor 159 rotates the periscope in a direction to compensate for yaw.

It may be desirable at some point during a run to provide a line of sight which is continuously oriented to the heading of the aircraft so that it is under the control of the pilot. We provide our computer with a heading synchro receiver, indicated generally by the reference character 352, and including a stator winding 354 and a rotor winding 356. The stator winding 354 of synchro receiver 352 is electrically connected to the rotor winding 334 of the heading synchro-transmitter 150 whereby rotor 356 produces an output signal which is representative of the true heading of the aircraft. This output signal from winding 356 is amplified by an amplifier 358 and fed to a servomotor 360. The shaft 362 of servomotor 360 drives rotor 356 in a direction to reduce its output signal to zero. A clutch 364 provides a driving connection between shaft 362 and a gear box 380 connected by a transmission 366 to the gear box 350. A linkage 368 driven by linkage 366 drives the brush 370 of a variable resistor 372. Leads 374 and 376 connect resistor 372 in the circuit of the pilot's direction indicator. A control 378 connected to gear box 380 by a shaft 382 provides a means by which the line of sight may be trained in azimuth. When it is desired to fix the line of sight in azimuth in the direction of the heading of the aircraft, clutch 364 is engaged so that the winding 344 of the drift synchro is rotated in accordance with changes in heading of the aircraft. Since winding 344 is now oriented to the true heading of the aircraft as modified by the drift, winding 344 will only produce an output signal as a function of changes in heading. As a result, the periscope will continuously be oriented in azimuth to the true heading of the aircraft. The electrical connections are such that a deviation of the aircraft from the heading existing at the time the clutch is engaged appears as an angle on the pilot's direction indicator. By means of control 378, the line of sight may be oriented in azimuth to the target and this angular movement also appears on the pilot's direction indicator. The line of sight is then under the control of the pilot and when he has turned the aircraft until the deviation indicator reads zero, the plane will be headed directly over the target.

In use, with a stabilized line of sight fixed in space, the roll synchro-transmitter 97 produces an output signal corresponding to roll which is fed to the roll synchro-receiver 228. Roll synchro-receiver 228 energizes the roll correction servomotor 234 to rotate the roll prism 202 and frame 206 carrying the pitch prism through an angle to reduce the error to zero. Similarly, the pitch synchro-transmitter 111 produces an output signal as a function of pitch of the aircraft which is fed to the pitch synchro-receiver 252. Pitch synchro-receiver 252 energizes the pitch correction servomotor 260 to rotate the pitch prism 216 of the periscope assembly until the error which would be introduced into the line of sight by pitch of the aircraft is reduced to zero. As has been explained hereinbefore, corrections for cross trail and elevation angle may also be introduced into the respective roll and pitch systems.

The drift angle of the aircraft is continuously computed by a means known to the art. The rotor 344 of the computer drift synchro-receiver is continuously rotated in accordance with the computed drift angle. The stator winding 332 of the heading synchro-transmitter 150 is supported by the pendulous bail 126 and continuously oriented to true heading of the aircraft by the bail. It will be appreciated, as explained hereinbefore, that bail 126 effectively translates a heading indication in the deck plane of the aircraft to the plane of the horizon. The course differential synchro 154 compares the true heading of the aircraft with the direction to which the frame 34 and the periscope tube 182 are oriented to produce an output signal representative of the comparison. If the line of sight is oriented in azimuth along the ground track of the aircraft, the output signal from the course differential synchro 154 will be equal to the drift angle. The output signal from the course differential synchro 154 is compared with the computed drift angle by the drift synchro receiver 340 so that rotor winding 344 of synchro receiver 340 produces an error signal which represents the correction to be applied to the line of sight in azimuth. This output signal from rotor 344 represents an angle in the plane of the horizon and is applied by servomotor 159 to the ring 12 and hence to the periscope tube 182. Since the compensating prisms carried by the periscope tube 182 provide a line of sight which is stabilized in the plane of the horizon, the rotation of the periscope tube in accordance with a true correction will properly orient the line of sight in azimuth. It is to be noted that as ring 12 is rotated by servomotor 159, the result of this rotation is measured in the plane of the horizon by winding 338 which is carried by the frame 34 and which is rotated in a direction to reduce the error signal generated in winding 344 to zero.

When it is desired to provide a line of sight which is held fixed to the true heading of the aircraft, clutch 364 is engaged. Winding 344 then produces an output signal which represents the difference of the angle between the true heading of the aircraft and the direction to which the periscope tube is oriented and the angle between the true heading and the computed drift angle. This results in the orientation of the line of sight in azimuth to the true heading of the aircraft. The control 378 provides a means for training the line of sight in azimuth. This training of the line of sight appears on the pilot's direction indicator and he may turn the aircraft until the direction indicator reads zero to bring the aircraft to a true heading which is the same as the heading to which the line of sight has been directed.

In use of our stabilized line of sight system on an aircraft or the like, the pilot directs the aircraft to cause the periscope 170 to be directed generally toward the object to be observed. The observer then looks through the eye piece 172 along a line of sight which is continuously stabilized in space. This stabilization will be understood from the description given hereinabove. The stabilized ring 24 actuates the roll and pitch synchronous transmitters 97 and 111 to produce output signals which are fed to the receivers 300 and 318 to energize servomotors 234 and 260 to orient the optical elements in a manner to stabilize the line of sight in both roll and pitch. At the same time the synchronous transmitter 150 produces a signal which compensates for yaw of the aircraft. In addition to this stabilization corrections may be made for both close trail and changes in elevation angle. The line of sight may be oriented with respect to either a true course or, if desired, to the heading of the craft in the manner described hereinabove.

Thus it will be seen that we have accomplished the objects of our invention. We have provided a line of sight stabilizing system by means of which the line of sight of a sighting device mounted in the deck plane of an aircraft may be stabilized with respect to the plane of the horizon and oriented in a fixed direction in space. We have provided a co-ordinate transformer which is adapted to translate an indication manifested in the deck plane of an aircraft to the plane of the horizon. Our line of sight stabilizing system, moreover, provides a means whereby a line of sight stabilized in the plane of the horizon may continuously be oriented to the true heading of an aircraft. Our line of sight stabilizing system enables us to maintain a true orientation of the line of sight irrespective of roll, pitch, yaw, or maneuvers of the aircraft or platform carrying the sighting device providing the line of sight.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A line of sight stabilization system for a craft having a deck plane including in combination a ring, means mounting said ring for rotation only about an axis fixed with respect to the deck plane, a control gyroscope assembly stabilized in the plane of the horizon and carried by said ring, said gyroscope assembly including means providing a fixed azimuth reference, a periscope assembly, means mounting said periscope assembly for rotation only about an axis fixed with respect to the deck plane, a driving connection between said ring and said periscope assembly, a course differential synchro-transmitter including a first winding and a second winding, said first winding being oriented by said means providing the fixed azimuth reference, a servomotor for driving said ring, an electrical connection between said second winding and said servomotor and a mechanical feedback means for translating motion from said servomotor to said second winding.

2. A line of sight stabilization system for a craft having a deck plane including in combination a ring, means mounting said ring for rotation only about an axis fixed with respect to the deck plane, a control gyroscope assembly stabilized in the plane of the horizon and carried by said ring, said gyroscope assembly including means providing a fixed azimuth reference, a periscope assembly, means mounting sid periscope assembly for rotation only about an axis fixed with respect to the deck plane, a driving connection between said ring and said periscope assembly, a course differential synchro-transmitter including a first winding and a second winding, a heading synchro-transmitter including a stator winding and a rotor winding, said first winding and said rotor winding being oriented in azimuth by said means providing the fixed azimuth reference, means for rotating said stator winding in accordance with changes in heading, an electrical connection between said first winding and said rotor winding, a drift synchro-receiver including a rotor winding and a stator winding, an electrical connection between said second winding and said drift synchro-receiver stator winding, means for rotating said drift angle synchro-receiver rotor winding in accordance with computed drift to produce an output signal, a servomotor controlled by said output signal for rotating said ring and a mechanical feedback means for translating motion from said ring to said second winding.

3. A line of sight stabilizing system for an aircraft having a deck plane comprising in combination a periscope, means mounting said periscope for rotation only about an axis fixed with respect to the deck plane, said periscope including optical elements providing a line of sight, a control gyroscope assembly providing a stabilized reference direction, said assembly including a frame, means mounting the gyroscope assembly for rotation only about an axis fixed with respect to the deck plane, means providing a driving engagement between said mounting means and said periscope, means carried by said frame for continuously measuring the angle between the direction of orientation of the line of sight and a reference direction to develop an error signal, and means actuated by said error signal for driving said gyroscope assembly mounting means in a direction to orient the frame to reduce said error signal to zero.

4. A line of sight stabilizing system for a craft having a deck plane including in combination a periscope, means mounting said periscope for rotation only about an axis fixed with respect to the deck plane, said periscope including optical elements providing a line of sight, a control gyroscope assembly providing a stabilized reference direction, said assembly including a frame, means mounting the gyroscope assembly for rotation only about an axis fixed with respect to the deck plane, means providing a driving engagement between said mounting means and said periscope, means carried by said frame for continuously measuring the angle between the craft true heading and the direction of orientation of said frame, means for comparing said measured angle with the computed drift angle to develop an error signal and means actuated by said error signal for driving said gyroscope assembly mounting means in a direction to orient said frame to reduce said error signal to zero.

5. A line of sight stabilizing system as in claim 4 wherein said gyroscope frame is stabilized in the horizontal plane and including means for orienting said periscope optical elements to compensate for errors resulting from deviations of the deck plane from the horizontal plane.

6. A line of sight stabilizing system as in claim 4 including a first servo loop for orienting one of said periscope optical elements to compensate for errors introduced into the line of sight by pitch of the craft and changes in elevation angle and a second servo loop for orienting another of said periscope optical elements to compensate for errors introduced into the line of sight by roll of the craft and for cross trail.

7. A line of sight stabilizing system as in claim 4 wherein said means actuated by the error signals is a servomotor mounted on the deck plane.

8. A line of sight stabilizing system as in claim 4 wherein said means for comparing said measured angle with the drift angle includes a computer drift synchro-transmitter having a rotor winding and a stator winding, and means for rotating said rotor winding in accordance with computed drift angle.

9. A line of sight stabilizing system for an aircraft having a deck plane comprising in combination a periscope providing a line of sight, means mounting said periscope for rotation only about an axis fixed with respect to the deck plane, a control gyroscope assembly including a frame, means mounting said control gyroscope assembly for rotation only about an axis fixed with respect to the deck plane, a heading synchro-transmitter having a rotor winding and a stator winding, means supporting said heading stator winding for rotation by relative angular movement of the deck plane, means for orienting said heading rotor winding to the reference direction whereby said heading rotor winding develops a signal proportional to the aircraft heading, a differential synchro-transmitter including a first winding and a second winding, means mounting said second differential winding on said gyroscope frame, means providing a driving connection between said heading rotor winding and said first differential winding, means for feeding the signal developed by said heading rotor winding to the first differential winding whereby said second differential winding develops a signal proportional to the angle between the aircraft heading and the direction to which said frame is oriented, a computer drift synchro-transmitter including a stator and rotor, means for feeding the signal developed by said second differential synchro winding to said drift stator, means for rotating said drift rotor in accordance with computed drift angle whereby said drift rotor produces a signal which is a measure of the difference of the angle between the aircraft heading and the direction to which said frame is oriented and the computed drift angle, drive means for driving said means mounting the control gyroscope assembly, said drive means being responsive to said last-mentioned signal and means providing a driving engagement between said periscope and said gyroscope assembly mounting means, so that said line of sight is continuously oriented to the aircraft course.

10. A line of sight stabilizing system as in claim 9 including means responsive to the signal developed in said heading rotor winding for rotating said drift rotor as a function of the aircraft heading so that the line of sight is fixed in space.

11. A line of sight stabilizing system as in claim 9 wherein said periscope includes optical elements providing the line of sight and including means for orienting said optical elements to compensate for errors resulting from deviations of the deck plane from the plane of the horizon.

References Cited in the file of this patent

UNITED STATES PATENTS

| 2,417,086 | Proskauer et al. | Mar. 11, 1947 |
| 2,428,678 | Norden et al. | Oct. 7, 1947 |
| 2,569,560 | Ford | Oct. 2, 1951 |
| 2,570,130 | Kenyon | Oct. 2, 1951 |
| 2,606,448 | Norden et al. | Aug. 12, 1953 |
| 2,684,007 | Newell | July 20, 1954 |
| 2,762,123 | Schultz | Sept. 11, 1956 |